United States Patent
Wang et al.

(10) Patent No.: US 11,328,395 B2
(45) Date of Patent: May 10, 2022

(54) IMAGE PROCESSING METHOD, IMAGE PROCESSING DEVICE, ELECTRONIC EQUIPMENT AND COMPUTER READABLE STORAGE MEDIUM

(71) Applicant: Shenzhen Intellifusion Technologies Co., Ltd., Guangdong (CN)

(72) Inventors: Heguo Wang, Guangdong (CN); Wen Jiang, Guangdong (CN); Lea Hwang Lee, Guangdong (CN); Dan Zhang, Guangdong (CN)

(73) Assignee: Shenzhen Intellifusion Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/471,187

(22) Filed: Sep. 10, 2021

(65) Prior Publication Data

US 2022/0114708 A1    Apr. 14, 2022

(30) Foreign Application Priority Data

Oct. 10, 2020  (CN) .......................... 202011076833.8

(51) Int. Cl.
*G06T 5/20*       (2006.01)
*G06T 7/10*       (2017.01)
(Continued)

(52) U.S. Cl.
CPC .................. *G06T 5/20* (2013.01); *G06T 7/10* (2017.01); *G06V 10/462* (2022.01); *G06V 10/50* (2022.01);
(Continued)

(58) Field of Classification Search
None
See application file for complete search history.

(56) References Cited

U.S. PATENT DOCUMENTS 10,678,508 B2 *   6/2020  Vantrease ............... G06F 17/15
10,983,754 B2 *   4/2021  Vantrease ............... G06F 17/15
(Continued)

FOREIGN PATENT DOCUMENTS

CN    110647978 A    1/2020
CN    111428189 A    7/2020

OTHER PUBLICATIONS

Dumoulin, Vincent, and Francesco Visin. "A guide to convolution arithmetic for deep learning." arXiv preprint arXiv: 1603.07285 (2016). (Year: 2016).*

*Primary Examiner* — Andrae S Allison

(57) ABSTRACT

An image processing method is configured to split a deconvolution kernel according to a preset splitting mode to obtain a sub-convolution kernel. And then, determining an original sub-matrix corresponding to the sub-convolution kernel, according to parameters of the sub-convolution kernel and an image feature matrix, and performing a convolution operation on the original sub-matrix corresponding to the sub-convolution kernel by using the sub-convolution kernel to obtain a deconvolution sub-matrix corresponding to each sub-convolution kernel; determining a target feature matrix according to the deconvolution sub-matrix corresponding to the sub-convolution kernel. When performing the deconvolution operation by the method, the image feature matrix doesn't need to perform tic-tac-toe filling to reduce a storage space occupied in the deconvolution operation process; in addition, since zero filled in the tic-tac-toe isn't participated in the deconvolution operation, calculation amount can be greatly reduced, and calculation efficiency of the deconvolution operation can be improved.

13 Claims, 9 Drawing Sheets

(51) Int. Cl.
*G06V 10/50* (2022.01)
*G06V 10/46* (2022.01)

(52) U.S. Cl.
CPC ............... *G06T 2207/20021* (2013.01); *G06T 2207/20024* (2013.01); *G06T 2207/20081* (2013.01); *G06T 2207/20084* (2013.01)

(56) References Cited

U.S. PATENT DOCUMENTS

| | | | | |
|---|---|---|---|---|
| 2017/0337471 | A1* | 11/2017 | Kadav | G06K 9/627 |
| 2020/0202200 | A1* | 6/2020 | Son | G06N 3/0454 |
| 2020/0410318 | A1* | 12/2020 | del Mundo | G06N 3/0454 |
| 2021/0271973 | A1* | 9/2021 | Zhang | G06N 3/0454 |

* cited by examiner

| D00 | 0 | D01 | 0 | D02 | 0 | D03 | 0 | D04 |
|-----|---|-----|---|-----|---|-----|---|-----|
| 0 | 0 | 0 | 0 | 0 | 0 | 0 | 0 | 0 |
| D10 | 0 | D11 | 0 | D12 | 0 | D13 | 0 | D14 |
| 0 | 0 | 0 | 0 | 0 | 0 | 0 | 0 | 0 |
| D20 | 0 | D21 | 0 | D22 | 0 | D23 | 0 | D24 |
| 0 | 0 | 0 | 0 | 0 | 0 | 0 | 0 | 0 |
| D30 | 0 | D31 | 0 | D32 | 0 | D33 | 0 | D34 |
| 0 | 0 | 0 | 0 | 0 | 0 | 0 | 0 | 0 |
| D40 | 0 | D41 | 0 | D42 | 0 | D43 | 0 | D44 |

FIG. 4

| D00 | 0 | D01 | 0 | D02 | 0 | D03 | 0 | D04 |
|---|---|---|---|---|---|---|---|---|
| 0 | 0 | 0 | 0 | 0 | 0 | 0 | 0 | 0 |
| D10 | 0 | D11 | 0 | D12 | 0 | D13 | 0 | D14 |
| 0 | 0 | 0 | 0 | 0 | 0 | 0 | 0 | 0 |
| D20 | 0 | D21 | 0 | D22 | 0 | D23 | 0 | D24 |
| 0 | 0 | 0 | 0 | 0 | 0 | 0 | 0 | 0 |
| D30 | 0 | D31 | 0 | D32 | 0 | D33 | 0 | D34 |
| 0 | 0 | 0 | 0 | 0 | 0 | 0 | 0 | 0 |
| D40 | 0 | D41 | 0 | D42 | 0 | D43 | 0 | D44 |

FIG. 5

| D00 | 0 | D01 | 0 | D02 | 0 | D03 | 0 | D04 |
|---|---|---|---|---|---|---|---|---|
| 0 | 0 | 0 | 0 | 0 | 0 | 0 | 0 | 0 |
| D10 | 0 | D11 | 0 | D12 | 0 | D13 | 0 | D14 |
| 0 | 0 | 0 | 0 | 0 | 0 | 0 | 0 | 0 |
| D20 | 0 | D21 | 0 | D22 | 0 | D23 | 0 | D24 |
| 0 | 0 | 0 | 0 | 0 | 0 | 0 | 0 | 0 |
| D30 | 0 | D31 | 0 | D32 | 0 | D33 | 0 | D34 |
| 0 | 0 | 0 | 0 | 0 | 0 | 0 | 0 | 0 |
| D40 | 0 | D41 | 0 | D42 | 0 | D43 | 0 | D44 |

FIG. 6

| D00 | 0 | D01 | 0 | D02 | 0 | D03 | 0 | D04 |
|---|---|---|---|---|---|---|---|---|
| 0 | 0 | 0 | 0 | 0 | 0 | 0 | 0 | 0 |
| D10 | 0 | D11 | 0 | D12 | 0 | D13 | 0 | D14 |
| 0 | 0 | 0 | 0 | 0 | 0 | 0 | 0 | 0 |
| D20 | 0 | D21 | 0 | D22 | 0 | D23 | 0 | D24 |
| 0 | 0 | 0 | 0 | 0 | 0 | 0 | 0 | 0 |
| D30 | 0 | D31 | 0 | D32 | 0 | D33 | 0 | D34 |
| 0 | 0 | 0 | 0 | 0 | 0 | 0 | 0 | 0 |
| D40 | 0 | D41 | 0 | D42 | 0 | D43 | 0 | D44 |

FIG. 7

| D00 | 0 | D01 | 0 | D02 | 0 | D03 | 0 | D04 |
|---|---|---|---|---|---|---|---|---|
| 0 | 0 | 0 | 0 | 0 | 0 | 0 | 0 | 0 |
| D10 | 0 | D11 | 0 | D12 | 0 | D13 | 0 | D14 |
| 0 | 0 | 0 | 0 | 0 | 0 | 0 | 0 | 0 |
| D20 | 0 | D21 | 0 | D22 | 0 | D23 | 0 | D24 |
| 0 | 0 | 0 | 0 | 0 | 0 | 0 | 0 | 0 |
| D30 | 0 | D31 | 0 | D32 | 0 | D33 | 0 | D34 |
| 0 | 0 | 0 | 0 | 0 | 0 | 0 | 0 | 0 |
| D40 | 0 | D41 | 0 | D42 | 0 | D43 | 0 | D44 |

FIG. 8

| 0 | 0 | 0 | 0 | 0 | 0 | 0 | 0 | 0 | 0 |
|---|---|---|---|---|---|---|---|---|---|
| 0 | D00 | 0 | D01 | 0 | D02 | 0 | D03 | 0 | D04 |
| 0 | 0 | 0 | 0 | 0 | 0 | 0 | 0 | 0 | 0 |
| 0 | D10 | 0 | D11 | 0 | D12 | 0 | D13 | 0 | D14 |
| 0 | 0 | 0 | 0 | 0 | 0 | 0 | 0 | 0 | 0 |
| 0 | D20 | 0 | D21 | 0 | D22 | 0 | D23 | 0 | D24 |
| 0 | 0 | 0 | 0 | 0 | 0 | 0 | 0 | 0 | 0 |
| 0 | D30 | 0 | D31 | 0 | D32 | 0 | D33 | 0 | D34 |
| 0 | 0 | 0 | 0 | 0 | 0 | 0 | 0 | 0 | 0 |
| 0 | D40 | 0 | D41 | 0 | D42 | 0 | D43 | 0 | D44 |

FIG. 9

| D11 | D12 | D13 |
|---|---|---|
| D21 | D22 | D23 |
| D31 | D32 | D33 |

FIG. 10

IMAGE PROCESSING METHOD, IMAGE PROCESSING DEVICE, ELECTRONIC EQUIPMENT AND COMPUTER READABLE STORAGE MEDIUM

1. TECHNICAL FIELD

The present disclosure generally relates to data processing technology fields, and especially relates to an image processing method, an image processing device, an electronic equipment and a computer readable storage medium.

2. DESCRIPTION OF RELATED ART

In the field of image processing, neural network is usually used to perform convolution, de-convolution, pooling, activation and other operations on an input image, to obtain an output image matrix. Furthermore, the de-convolution, also known as transpose convolution, can convert a smaller feature matrix into a larger feature matrix.

In a current de-convolution operation method, an input image feature matrix is usually performed tic-tac-toe filling (padding), one or more zeros are filled between parameters of two adjacent matrices in the feature matrix to enlarge size information of the image. And then, performing a convolution operation on a filled matrix by using de-convolution kernels to obtain a larger feature matrix, according to a convolution operation method.

In the de-convolution operation method, a large number of zeros are needed to be filled, so that a large storage space is occupied by zeros, moreover, the filled zeros are participated in the convolution operation to increase calculation amount, and seriously affect operation efficiency of the image processing.

SUMMARY

The technical problems to be solved: in view of the shortcomings of the related art, the present disclosure relates to an image processing method, an image processing device, an electronic equipment and a computer readable storage medium which can solve problems that a large storage space and low efficiency are occurred in a conventional image processing de-convolution operation method.

In a first respect, an image processing method according to an embodiment of the present disclosure includes:

obtaining an image feature matrix and a de-convolution kernel;

splitting the de-convolution kernel according to a preset splitting mode to obtain a sub-convolution kernel;

determining an original sub-matrix corresponding to the sub-convolution kernel, according to parameters of the sub-convolution kernel and the image feature matrix;

performing a convolution operation on the original sub-matrix corresponding to the sub-convolution kernel by using the sub-convolution kernel to obtain a de-convolution sub-matrix corresponding to the sub-convolution kernel; and determining a target feature matrix according to the de-convolution sub-matrix corresponding to each sub-convolution kernel.

In a second respect, an image processing device according to an embodiment of the present disclosure includes:

a data obtaining module configured to obtain an image feature matrix and a de-convolution kernel;

a kernel splitting module configured to split the de-convolution kernel according to a preset splitting mode to obtain a sub-convolution kernel;

a matrix obtaining module configured to determine an original sub-matrix corresponding to the sub-convolution kernel, according to parameters of the sub-convolution kernel and the image feature matrix;

a convolution operation module configured to perform a convolution operation on the original sub-matrix corresponding to the sub-convolution kernel by using the sub-convolution kernel to obtain a de-convolution sub-matrix corresponding to the sub-convolution kernel and a matrix synthesis module configured to determine a target feature matrix according to the de-convolution sub-matrix corresponding to each sub-convolution kernel.

In a third respect, an electronic equipment according to an embodiment of the present disclosure includes a memory, a processor and computer programs stored in the memory and performed by the processor to implement steps of the image processing method above mentioned in the first aspect.

In a fourth respect, a computer readable storage medium according to an embodiment of the present disclosure is configured to store computer programs performed by a processor to implement steps of the image processing method above mentioned in the first aspect.

In a fifth respect, a computer program product according to an embodiment of the present disclosure is configured to be performed by an electronic equipment to implement steps of the image processing method above mentioned in the first aspect.

Comparing with the related art, the present disclosure provides the advantages as below.

In the image processing method of the present disclosure, the electronic equipment is configured to split the de-convolution kernel according to the preset splitting mode to obtain a sub-convolution kernel. And then, the electronic equipment is configured to determine the original sub-matrix corresponding to the sub-convolution kernel according to parameters of the sub-convolution kernel and the image feature matrix, and perform the convolution operation on the original sub-matrix corresponding to the sub-convolution kernel by using the sub-convolution kernel to obtain the de-convolution sub-matrix corresponding to each sub-convolution kernel. Finally, the electronic equipment is configured to determine the target feature matrix according to the de-convolution sub-matrix corresponding to the sub-convolution kernel.

In the current de-convolution operation method, tic-tac-toe filling needs to be performed on an input image feature matrix and then perform the convolution operation on a filled image feature matrix by using de-convolution kernels. In the process of performing the convolution operation, some of weight values in the de-convolution kernel are calculated with zeros being filled in the tic-tac-toe, which is invalid. Therefore, in the image processing method of the present disclosure, the de-convolution kernel is split by the electronic equipment to obtain the sub-convolution kernel. The sub-convolution kernels represent valid weight values in each convolution operation. Then, performing the convolution operation on a corresponding original sub-matrix by using the sub-convolution kernel, it means that only valid weight values participate in the convolution operation. The original sub-matrix does not need to be operated by filling redundant zeros in the tic-tac-toe and invalid weight values, so that data amount participated in the de-convolution operation and the storage space occupied in the de-convolution operation process can be greatly reduced. In addition, since zero filling on the tic-tac-toe isn't participated in the de-convolution operation, calculation amount can be greatly reduced, and calculation efficiency of the de-convolution operation can be improved.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the art, other drawings can be obtained according to the drawings below on the premise of no creative work.

FIG. 4 is a schematic diagram of a third application scenario in accordance with an embodiment of the present disclosure.

FIG. 5 is a schematic diagram of a fourth application scenario in accordance with an embodiment of the present disclosure.

FIG. 6 is a schematic diagram of a fifth application scenario in accordance with an embodiment of the present disclosure.

FIG. 7 is a schematic diagram of a sixth application scenario in accordance with an embodiment of the present disclosure.

FIG. 8 is a schematic diagram of a seventh application scenario in accordance with an embodiment of the present disclosure.

FIG. 9 is a schematic diagram of an eighth application scenario in accordance with an embodiment of the present disclosure.

FIG. 10 is a schematic diagram of a ninth application scenario in accordance with an embodiment of the present disclosure.

DETAILED DESCRIPTION

In the following description, specific details such as structures of a specific system, a technology, etc. are provided for illustration rather than qualification purposes for thoroughly understanding of embodiments of the present disclosure. However, one of ordinary skill in the art should be aware that the present disclosure can be realized in other embodiments without these specific details. In other cases, detailed descriptions of well-known systems, devices, circuits, and methods are omitted so that the description of the present disclosure can't be precluded by unnecessary details.

In order to illustrate the technical solution of the present disclosure, specific embodiments are described in detail below.

It can be understood that, when used in the specification and the attached claims, the term "include" is indicated that features, wholes, steps, operations, elements and/or components described exist, without excluding to exist or add one or more other features, wholes, steps, operations, elements, components and/or collections thereof.

It can be also understood that the terms used herein are intended only to describe specific embodiments rather than being intended to limit the present disclosure. As described in the specification and the attached claims, the singular terms "one", "a" and "the" are intended to include the plural, unless the context clearly indicates otherwise.

It should also be further understood that the term "and/or" described in the specification and the attached claims is indicated that any combination and all possible combinations of one or more of the items is listed in relation to each other, and include the combinations thereof.

As described in the specification and the attached claims, the term "if" can be interpreted in context as "when . . . " or "once" or "responding to determine" or "responding to detect". Similarly, the phrases "if determining" or "if detecting [described conditions or events]" can be interpreted depending on contexts to mean "once determining" or "in response to determine" or "once detecting [described conditions or events]" or "in response to detect [described conditions or events]".

For specific implementations, mobile terminals described in the embodiments of the present disclosure include, but are not limited to, other portable devices such as mobile phones, laptops or tablet computers having touch-sensitive surfaces (for example, touch-screen displays and/or touch pads). It should also be understood that, in some embodiments, the above device is not a portable communication device, but a desktop computer with a touch-sensitive surface (for example, a touch-screen display and/or a touch pad).

In addition, in the description of the present disclosure, terms "first", "second", "third", etc., are used only to distinguish the description rather than indicating or implicating a relative importance between elements thereof.

A First Embodiment

Figure 1:
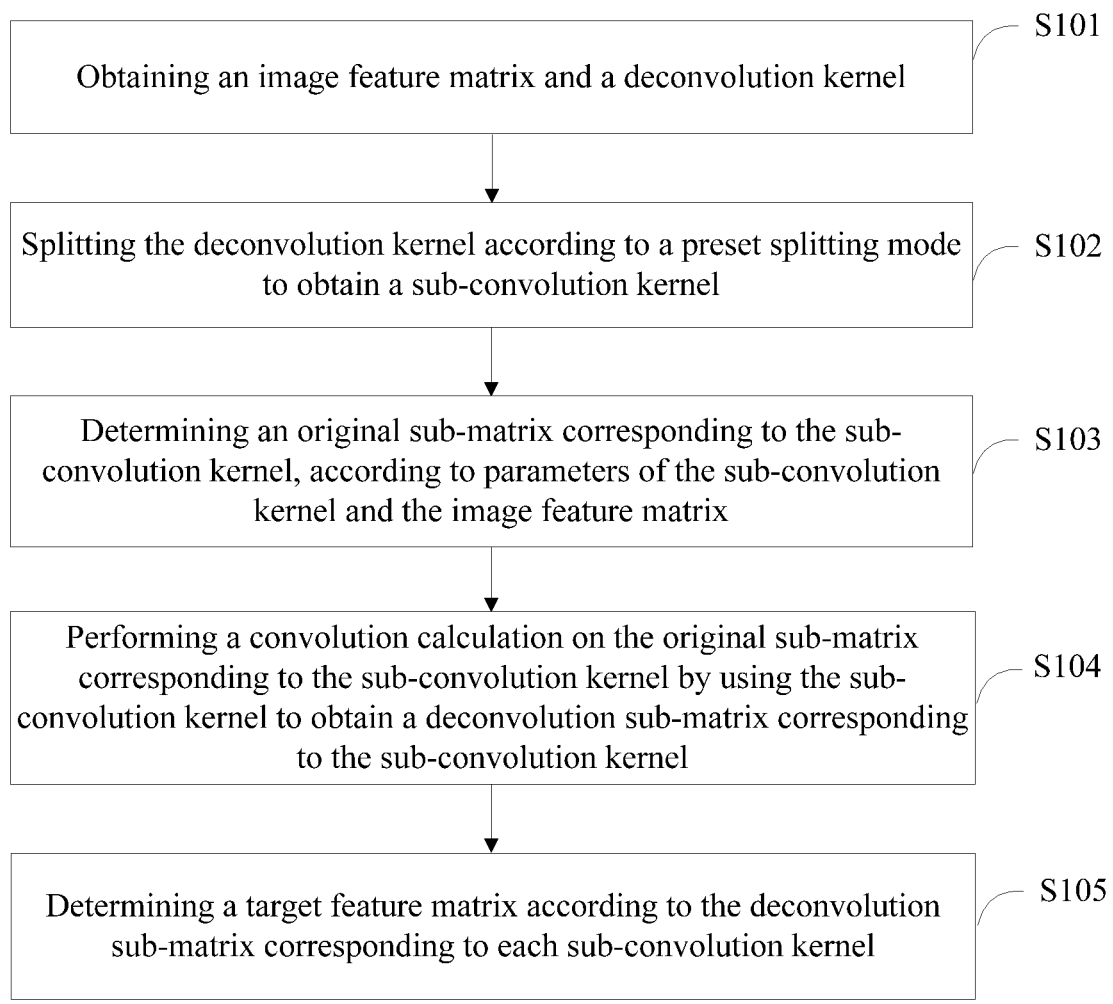
FIG. 1 is a flowchart of an image processing method in accordance with an embodiment of the present disclosure.

Referring to FIG. 1, a following description of an image processing method in accordance with an embodiment of the present disclosure is provided below. The image processing method includes:

step S101, obtaining an image feature matrix and a de-convolution kernel;

as a common operation, de-convolution is widely applied to neural network, so as to convert a smaller feature matrix into a larger feature matrix.

When performing the de-convolution operation, the image feature matrix and the de-convolution kernel can be obtained at first.

The image feature matrix is a data matrix that needs to perform the de-convolution operation. Types of the image feature matrix can be determined according to actual conditions. For example, when performing the de-convolution operation on an image, the image feature matrix described above can be a matrix of pixel values of the image, or a matrix of gray values of the image, or also a matrix of feature values of the image. Alternatively, in other application scenarios, the image feature matrix can be other types of matrices.

The de-convolution kernel is a matrix of preset weight values. When the de-convolution operation is performed, the electronic equipment is configured to perform the de-convolution operation on the image feature matrix by using weight values of the de-convolution kernel, so as to obtain a target feature matrix.

Step S102, splitting the de-convolution kernel according to a preset splitting mode to obtain a sub-convolution kernel.

When the electronic equipment performs the de-convolution operation, the de-convolution kernel can be split according to the preset splitting mode to obtain a plurality of sub-convolution kernels.

The preset splitting mode can be determined according to actual conditions. In some embodiments of the present disclosure, the electronic equipment can be configured to obtain a transverse sliding step length sw and a longitudinal sliding step length sh of the de-convolution kernel; and split the deconvolution kernel according to the transverse sliding step length and the longitudinal sliding step length, so as to obtain (sw×sh) sub-convolution kernels.

For example, it is assumed that the transverse sliding step length of the de-convolution kernel is two, the longitudinal sliding step length of the de-convolution kernel is also two, the electronic equipment can split the de-convolution kernel into (2×2)=4 sub-convolution kernels.

Both the transverse sliding step length sw and the longitudinal sliding step length sh of the de-convolution kernel are preset parameters in the electronic equipment.

Specifically, the electronic equipment is configured to obtain a row serial number Q and a column serial number P of the sub-convolution kernel, wherein Q is a natural number smaller than sh, and P is a natural number smaller than sw; and then, the electronic equipment is configured to determine a weight value of a $(Q+K_1 \times sh - P_{T1}+1)$-th column and a $(P+K_2 \times sw - P_{L1}+1)$-th row in the de-convolution kernel as a weight value of the sub-convolution kernel to obtain the (sw×sh) sub-convolution kernels. Wherein, K1 and K2 are natural numbers, $P_{L1}$ is the number of left-side reverse filling layers, $P_{T1}$ is the number of top reverse filling layers, $(Q+K_1 \times sh - P_{T1}+1)$ is less than or equal to a longitudinal size kh of the de-convolution kernel, and $(P+K_2 \times sw - P_{L1}+1)$ is less than or equal to a transverse size kw of the de-convolution kernel. The transverse size kw and the longitudinal size kh of the de-convolution kernel are parameters preset in the electronic equipment.

Figures 2, 3:
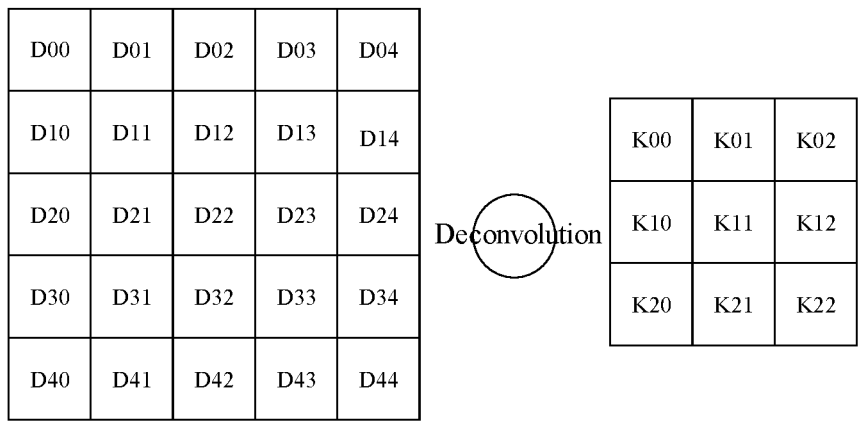
FIG. 2 is a schematic diagram of a first application scenario in accordance with an embodiment of the present disclosure.
FIG. 3 is a schematic diagram of a second application scenario in accordance with an embodiment of the present disclosure.

A derivation process of the splitting mode of the sub-convolution kernel is as follows:

referring to FIG. 2, it is assumed that the image feature matrix is a 5×5 matrix, and original data in the image feature matrix is from D00 to D44. The de-convolution kernel is a 3×3 matrix, and weight values of the de-convolution kernel are from K00 to K22. Both the transverse sliding step length sw and the longitudinal sliding step length sh of the de-convolution kernel are two.

In the current de-convolution mode, the electronic equipment is configured to perform tic-tac-toe filling on the image feature matrix, that is, (sw−1) zeros are inserted into two original data that are transversely adjacent to each other, and (sh−1) zeros are inserted into two original data that are longitudinally adjacent to each other, so as to obtain a calculation matrix as shown in FIG. 3.

Then, the electronic equipment can be further configured to perform a sliding convolution on the above calculation matrix by using the de-convolution kernel to obtain the target feature matrix. The process of performing the sliding convolution of the de-convolution kernel can be seen in FIGS. 4-8.

Referring to FIGS. 4-8, bolded boxes represent a position where a sliding window of the de-convolution kernel is currently located. As shown in FIG. 4, when the convolution operation is performed on the de-convolution kernel, original data in the sliding window are only D00, D01, D10 and D11, and original data in other positions are zero. That is to say, when performing a calculation on the de-convolution kernel and the original data in the sliding window, only original data K00, K02, K20, and K22 are valid, while, weight values of other positions are multiplied by zero to obtain zero, which is invalid.

Referring to FIG. 5, when the sliding window slides to a next position, valid weight values are K01 and K21. As shown in FIG. 6, as the sliding window continues to slide to another next position, valid weight values become back K00, K02, K20, K22.

Referring to FIG. 7, when the sliding window slides down once from the position shown in FIG. 4, valid weight values are K10 and K12. As the sliding window continues to slide down, valid weight values become back K00, K02, K20, K22.

Referring to FIG. 8, when the sliding window slides towards the right once from the position shown in FIG. 7, the valid weight value is K11. As the sliding window continues to slide towards the right, valid weight values become back K10 and K12.

That is to say, when the de-convolution kernel is subjected to perform the sliding convolution on the calculation matrix, only some of the weight values are valid in the convolution operation, and the rest of the weight values are multiplied by zero and are invalid.

Therefore, in the image processing method of the present disclosure, the valid weight values in each convolution operation can be split into a sub-convolution kernel, performing the convolution operation on the sub-convolution kernel and corresponding original data, so that computation of the invalid weight values multiplied by zero can be reduced, and computation and a storage space can also be reduced.

The sub-convolution kernel is determined by the valid weight values in each convolution operation. The valid weight values are changed regularly, which is related to the number of zeros filled in the tic-tac-toe, that is, the valid weight value is transversely slid once circularly every sw times and longitudinally repeated once circularly every sh times.

That is to say, a valid part of the de-convolution kernel has sw variations in the transverse direction and sh variations in the longitudinal direction.

The valid part of the de-convolution kernel can be split into (sw×sh) cases, according to transverse and longitudinal changes. Thus, the electronic equipment can split the de-convolution kernel into (sw×sh) sub-convolution kernels.

The row serial number Q and the column serial number P can be given to each sub-convolution kernel by the electronic equipment, wherein Q is a natural number smaller than sh, and P is a natural number smaller than sw, and Q and P are configured for distinguishing (sw×sh) sub-convolution kernels.

Referring to FIGS. 4-8, in each convolution process, a distribution rule of the valid weight values is consistent with a rule of the filled tic-tac-toe. Therefore, in the sub-convolution kernel, the column serial numbers of every two adjacent weight values in the transverse direction are differed by sw columns, and the row serial numbers of every two adjacent weight values in the longitudinal direction are differed by sh rows.

It is assumed that a first weight value with a row serial number of zero and a column serial number of zero in the sub-convolution kernel is set as a weight value of a first row and a first column in the de-convolution kernel, selecting one weight value every sw columns from the weight value of the first row and the first column in the de-convolution kernel according to the above rule, and selecting one weight value every sh rows until the de-convolution kernel is traversed to obtain the sub-convolution kernel with the row serial number of zero and the column serial number of zero.

That is to say, for the sub-convolution kernel with the row serial number of zero and the column serial number of zero, the electronic equipment can be configured to determine a weight value of a ($K_1 \times sh+1$)-th row and a ($K_2 \times sw+1$)-th column in the de-convolution kernel as a weight value of the sub-convolution kernel, that is, K00, K02, K20 and K22.

Similarly, for the sub-convolution kernel with the row serial number of Q and the column serial number of P, the electronic equipment can be configured to determine a weight value of a ($Q+K_1 \times sh-P_{T1}+1$)-th row and a ($P+K_2 \times sw-P_{L1}+1$)-th column in the de-convolution kernel as a weight value of the sub-convolution kernel.

In addition, the electronic equipment is needed to perform edge filling when performing the de-convolution operation in some cases. The edge filling is referred to fill one or more layers of zeros at edges of the image feature matrix.

At this time, the electronic equipment can be configured to correspondingly adjust the weight values of each sub-convolution kernel according to the number of left-side reverse filling layers and the number of top reverse filling layers.

Taking a scenario of FIG. 9 as an example, it is assumed that both the number $P_{L1}$ of left-side reverse filling layers and the number $P_{T1}$ of top reverse filling layers are one, which means that both the left-side and the top of the image feature matrix need to be filled with one column of zeros, respectively, so as to obtain the calculation matrix shown in FIG. 9.

At this time, the electronic equipment can be configured to correspondingly adjust weight values of each sub-convolution kernel according to the number $P_{L1}$ of left-side reverse filling layers and the number $P_{T1}$ of top reverse filling layers.

For the sub-convolution kernel with the row serial number of zero and the column serial number of zero, the electronic equipment can be configured to determine a weight value of a ($K_1 \times sh-P_{T1}+1$)-th row and a ($K_2 \times sw-P_{L1}+1$)-th column in the de-convolution kernel as the weight value of the sub-convolution kernel, that is, K11.

For the sub-convolution kernel with the row serial number of Q and the column serial number of P, the electronic equipment can be configured to determine a weight value of a ($Q+K_1 \times sh-P_{T1}+1$)-th row and a ($P+K_2 \times sw-P_{L1}+1$)-th column in the de-convolution kernel as the weight value of the sub-convolution kernel.

Step S103, determining an original sub-matrix corresponding to the sub-convolution kernel, according to parameters of the sub-convolution kernel and the image feature matrix;

As it can be seen from the embodiments of the present disclosure shown in FIGS. 4-8, convolution objects of the sub-convolution kernels are not necessarily all the original data in the image feature matrix.

Taking a scenario of FIG. 8 as an example, it is assumed that the weight value of the sub-convolution kernel, with both the row serial number Q and the column serial number P being one, only includes K11, and a size of the sub-convolution kernel is 1×1. Referring to FIG. 8, a convolution object by performing a first convolution of the sub-convolution kernel is D11, and a convolution object by performing the last convolution is D33. That is to say, the original sub-matrix corresponding to the sub-convolution kernel should be shown as FIG. 10, which is nine original data D11, D12, D13, D21, D22, D23, D31, D32 and D33 in a middle of the image feature matrix.

So, after determining the sub-convolution kernel, the electronic equipment can be configured to determine the original sub-matrix corresponding to each sub-convolution kernel, according to the parameters of each sub-convolution kernel and the above image feature matrix.

When determining the original sub-matrix, the electronic equipment can obtain the number $P_{L1}$ of left-side reverse filling layers and the column serial number P of the sub-convolution kernel. And then, the electronic equipment can calculate a number $P_{L2}$ of left-side target filling layers according to the number $P_{L1}$ of left-side reverse filling layers and the column serial number P of the sub-convolution kernel, and then subtract P from $P_{L1}$ to obtain $P_{L2}$:

$$P_{L2}=P_{L1}-P$$

The number $P_{L2}$ of left-side target filling layers represents an actual number of columns to be filled on the left-side of the image feature matrix. When $P_{L2}$ is greater than zero, it represents that $P_{L2}$ columns of zeros need to be filled on the left-side of the image feature matrix; when $P_{L2}$ is equal to zero, it represents that the left-side of the image feature matrix does not need to be filled with zero; when $P_{L2}$ is less than zero, it represents that 1 $P_{L2}$ columns of original data is needed to be reduced on the left-side of the image feature matrix, that is, starting from a ($|P_{L2}|+1$)-th column, $|P_{L2}|$ is an absolute value of $P_{L2}$.

Similarly, the electronic equipment can be configured to obtain the number $P_{T1}$ of top reverse filling layers and the row serial number Q of the sub-convolution kernel. And then, the electronic equipment can calculate a number $P_{T2}$ of top target filling layers cording to the number $P_{T1}$ of the top reverse filling layers and the row serial number Q of the sub-convolution kernel, and then subtract Q from $P_{T1}$ to obtain $P_{T2}$:

$$P_{T2}=P_{T1}-Q$$

The number $P_{T2}$ of top target filling layers represents an actual number of columns to be filled on the top of the image feature matrix. When $P_{T2}$ is greater than zero, it represents that $P_{T2}$ rows of zeros need to be filled on the top of the image feature matrix; when $P_{T2}$ is equal to zero, it represents that the top of the image feature matrix does not need to be filled with zero; when $P_{T2}$ is less than zero, it represents that $P_{T2}$ rows of original data is needed to be reduced on the top of the image feature matrix, that is, starting from a ($|P_{T2}|+1$)-th row, $|P_{T2}|$ is an absolute value of $P_{T2}$.

And then, the electronic equipment can be configured to obtain a transverse size cow of a target feature matrix, and a longitudinal size coh of the target feature matrix. Furthermore, the electronic equipment can be further configured to calculate a transverse size zow of the de-convolution sub-matrix according to the transverse size cow of the target feature matrix, the transverse sliding step length sw and the column serial number P of the sub-convolution kernel, and then calculate a quotient $d_1$ and a remainder $r_1$ of cow and sw.

According to the above description, the quotient $d_1$ is indicated that the sliding window has gone through $d_1$ complete cycles in the transverse direction. The remainder $r_1$ is indicated that only a previous $r_1$ sub-convolution kernels are participated in the operation in a ($d_1+1$)-th cycle.

Therefore, the electronic equipment can obtain the column serial number P of the sub-convolution kernel. If the column serial number P of the sub-convolution kernel is less than $r_1$, determining ($d_1$+1) as the transverse size zow of the de-convolution sub-matrix. If the column serial number P of the sub-convolution kernel is greater than or equal to $r_1$, determining $d_1$ as the transverse size zow of the de-convolution sub-matrix.

Similarly, the electronic equipment can be configured to calculate a longitudinal size zoh of the de-convolution sub-matrix according to the longitudinal size coh of the target feature matrix, the longitudinal sliding step length sh and the row serial number Q of the sub-convolution kernel, and then calculate a quotient $d_2$ and a remainder $r_2$ of coh and sh.

According to the above conditions, the quotient $d_2$ is indicated that the sliding window has gone through $d_2$ complete cycles in the longitudinal direction. The remainder $r_2$ is indicated that only a previous $r_2$ sub-convolution kernels are participated in the operation in a ($d_2$+1)-th cycle.

Therefore, the electronic equipment can obtain the row serial number Q of the sub-convolution kernel. If the row serial number Q of the sub-convolution kernel is less than $r_2$, determining ($d_2$+1) as the longitudinal size zoh of the de-convolution sub-matrix. If the row serial number Q of the sub-convolution kernel is greater than or equal to $r_2$, determining $d_2$ as the longitudinal size zoh of the de-convolution sub-matrix.

After obtaining the transverse size zow and the longitudinal size zoh of the de-convolution sub-matrix, the electronic equipment can be configured to determine a number $P_{R2}$ of right-side target filling layers according to a transverse size ciw of the image feature matrix, the transverse size zow of the de-convolution sub-matrix, a transverse size zkw of the sub-convolution kernel and the number $P_{L2}$ of left-side target filling layers, that is:

$$P_{R2}=zow-P_{L2}-ciw+zkw-1$$

The number $P_{R2}$ of right-side target filling layers represents an actual number of columns to be filled on the right-side of the image feature matrix. When $P_{R2}$ is greater than zero, it represents that $P_{R2}$ columns of zeros need to be filled on the right-side of the image feature matrix; when $P_{R2}$ is equal to zero, it represents that the right-side of the image feature matrix does not need to be filled with zero; when $P_{R2}$ is less than zero, it represents that $|P_{R2}|$ columns of original data is needed to be reduced on the right-side of the image feature matrix, that is, starting from a ($|P_{R2}|$+1)-th column, $|P_{R2}|$ is an absolute value of $P_{R2}$.

Similarly, the electronic equipment can be configured to determine a number $P_{G2}$ of bottom target filling layers according to a longitudinal size cih of the image feature matrix, the longitudinal size zoh of the de-convolution sub-matrix, a longitudinal size zkh of the sub-convolution kernel and the number $P_{T2}$ of top target filling layers; that is:

$$P_{G2}=zoh-P_{T2}-cih+zkh-1$$

The number $P_{G2}$ of bottom target filling layers represents an actual number of columns to be filled on the bottom of the image feature matrix. When $P_{G2}$ is greater than zero, it represents that $P_{G2}$ rows of zeros need to be filled on the bottom of the image feature matrix; when $P_{G2}$ is equal to zero, it represents that the bottom of the image feature matrix does not need to be filled with zero; when $P_{G2}$ is less than zero, it represents that $|P_{G2}|$ rows of original data is needed to be reduced on the bottom of the image feature matrix, that is, starting from a ($|P_{G2}|$+1)-th row, $|P_{G2}|$ is an absolute value of $P_{G2}$.

After determining the number $P_{L2}$ of left-side target filling layers, the number $P_{T2}$ of top target filling layers, the number $P_{R2}$ of right-side target filling layers and the number $P_{G2}$ of bottom target filling layers, the electronic equipment can be configured to process edges of the image feature matrix according to these above filling layers, by performing the zero filling or deleting corresponding original data to obtain the original sub-matrix of the sub-convolution kernel.

All the number $P_{L1}$ of left-side reverse filling layers, the number $P_{T1}$ of top reverse filling layers, the transverse size cow and the longitudinal size coh of the target feature matrix are parameters preset in the electronic equipment. The transverse size ciw and the longitudinal size cih of the image feature matrix can be obtained from the image feature matrix. The transverse size zkw and the longitudinal size zkh of the sub-convolution kernel can be obtained after the sub-convolution kernel is determined.

Through the method, the electronic equipment can be configured to calculate the original sub-matrix corresponding to each sub-convolution kernel according to the parameters of each sub-convolution kernel.

Taking scenarios of FIG. 2, FIG. 8, and FIG. 10 as examples, it is assumed that both the row serial number and the column serial number of a certain sub-convolution kernel are one, and both the transverse size zkw and the longitudinal size zkh of the sub-convolution kernel are also one. Both the transverse size ciw and the longitudinal size cih of the image feature matrix are five. Both the number $P_{L1}$ of left-side reverse filling layers and the number $P_{T1}$ of top reverse filling layers are zero, and both the transverse size cow and the longitudinal size coh of the target feature matrix are seven.

It can be obtained that both the number $P_{L2}$ of left-side target filling layers and the number $P_{T2}$ of top target filling layers respectively corresponding to the sub-convolution kernel are −1, by calculating according to the row serial number and the column serial number of the sub-convolution kernel, the number $P_{L1}$ of left-side reverse filling layers, the number $P_{T1}$ of top reverse filling layers.

It can be obtained that $d_1$ is three and $r_1$ is one, by calculating the quotient $d_1$ and the remainder $r_1$ of the transverse size cow of the target feature matrix and the transverse sliding step length sw. While, it can be obtained that $d_2$ is three and $r_2$ is one, by calculating the quotient $d_2$ and the remainder $r_2$ of the longitudinal size coh of the target feature matrix and the longitudinal sliding step length sh.

Since P is equal to $r_1$, zow is three, while, Q is equal to $r_2$, zoh is three. Then:

$$P_{R2}=3-(-1)-5+1-1=-1$$

$$P_{G2}=3-(-1)-5+1-1=-1$$

Therefore, all the number $P_{L2}$ of left-side target filling layers, the number $P_{T2}$ of top target filling layers, the number $P_{R2}$ of right-side target filling layers, and the number $P_{G2}$ of bottom target filling layers are −1, it is indicated that all the left, the right, the top and the bottom of the image feature matrix are needed to be deleted one row/column of original data, so as to obtain the original sub-matrix as shown in FIG. 10.

Step S104, performing a convolution operation on the original sub-matrix corresponding to the sub-convolution kernel by using the sub-convolution kernel to obtain the de-convolution sub-matrix corresponding to the sub-convolution kernel;

after obtaining, the original sub-matrix corresponding to each sub-convolution kernel, the electronic equipment can perform the convolution operation on the original sub-matrix corresponding to the sub-convolution kernel by using the sub-convolution kernel to obtain the de-convolution sub-matrix corresponding to each sub-convolution kernel.

Step S105, determining the target feature matrix according to the de-convolution sub-matrix corresponding to each sub-convolution kernel.

Because a convolution process of weight values in the sub-convolution kernel and the original sub-matrix is equivalent to a convolution process of the de-convolution kernel and the calculation matrix, after the de-convolution sub-matrix is obtained, each de-convolution sub-matrix can be regrouped and combined according to a corresponding relationship between the sub-convolution kernel and the de-convolution kernel, to obtain the target feature matrix.

Specifically, the electronic equipment can be configured to determine data of a i-th row and a j-th column in the de-convolution sub-matrix corresponding to the sub-convolution kernel with the row serial number of Q and the column serial number of P as data of a (i×sw−sw+Q+1)-th row and a (j×sh−sh+P+1)-th column in the target feature matrix, so as to obtain the target feature matrix.

In the image processing method of the present disclosure, the electronic equipment is configured to split the de-convolution kernel according to the preset splitting mode to obtain the sub-convolution kernel. And then, the electronic equipment is configured to determine the original sub-matrix corresponding to the sub-convolution kernel according to the parameters of the sub-convolution kernel and the image feature matrix, and perform the convolution operation on the original sub-matrix corresponding to the sub-convolution kernel by using the sub-convolution kernel to obtain the de-convolution sub-matrix corresponding to each sub-convolution kernel. Finally, the electronic equipment is configured to determine the target feature matrix according to the de-convolution sub-matrix corresponding to the sub-convolution kernel.

When the electronic equipment is configured to perform the de-convolution operation by the above method, it isn't needed to perform tic-tac-toe filling on the image feature matrix, so as to reduce data amount involved in the de-convolution operation and the storage space occupied in the de-convolution operation process. In addition, since the zero filling in the tic-tac-toe isn't participated in the de-convolution operation, calculation amount can be greatly reduced, and calculation efficiency of the de-convolution operation can be improved.

It should be understood that sequence numbers of the steps in the above embodiments do not imply orders to be performed, sequences to perform each process shall be determined by its functions and internal logics, rather than to constitute any limitations to perform the embodiments of the present disclosure.

A Second Embodiment

Figure 11:
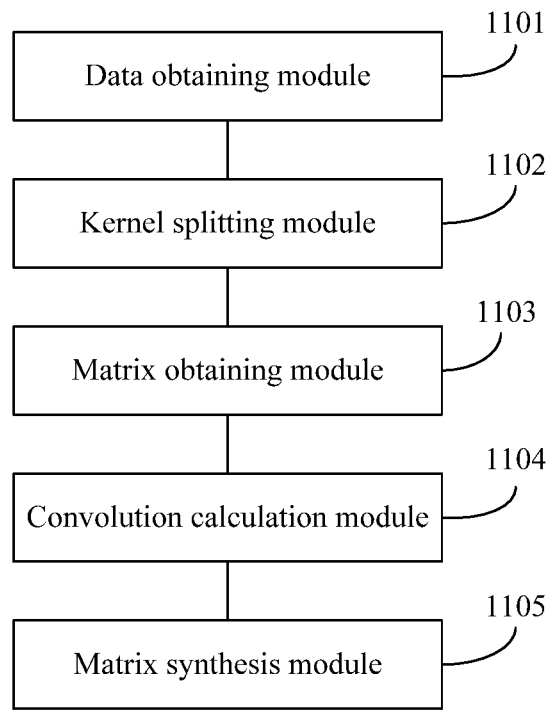
FIG. 11 is a schematic diagram of an image processing device in accordance with an embodiment of the present disclosure.

An image processing device in accordance with an embodiment of the present disclosure is provided. For ease of illustration, only parts related to the present disclosure are shown. Referring to FIG. 11, the image processing device includes:

a data obtaining module 1101 configured to obtain an image feature matrix and a de-convolution kernel;

a kernel splitting module 1102 configured to split the de-convolution kernel according to a preset splitting mode to obtain a sub-convolution kernel;

a matrix obtaining module 1103 configured to determine an original sub-matrix corresponding to the sub-convolution kernel, according to parameters of the sub-convolution kernel and the image feature matrix;

a convolution operation module 1104 configured to perform a convolution operation on the original sub-matrix corresponding to the sub-convolution kernel by using the sub-convolution kernel to obtain a de-convolution sub-matrix corresponding to the sub-convolution kernel and a matrix synthesis module 1105 configured to determine a target feature matrix according to the de-convolution sub-matrix corresponding to each sub-convolution kernel.

Optionally, the kernel splitting module 1102 includes:

a sliding step length sub-module configured to obtain a transverse sliding step length sw and a longitudinal sliding step length sh of the de-convolution kernel; and a step length splitting sub-module configured to split the de-convolution kernel according to the transverse sliding step length sw and the longitudinal sliding step length sh to obtain (sw×sh) sub-convolution kernels.

Optionally, the step length splitting sub-module includes:

a sequence number obtaining sub-module configured to obtain a row serial number Q and a column serial number P of the sub-convolution kernel, wherein Q is a natural number smaller than sh, and P is a natural number smaller than sw;

a weight splitting sub-module configured to determine a weight value of a $(Q+K_1 \times sh - P_{T1}+1)$-th row and a $(P+K_2 \times sw - P_{L4}+1)$-th column in the de-convolution kernel as a weight value of the sub-convolution kernel to obtain the (sw×sh) sub-convolution kernels; and wherein, K1 and K2 are natural numbers, $P_{L1}$ is the number of left-side reverse filling layers, $P_{T1}$ is the number of top reverse filling layers, $(Q+K_1 \times sh - P_{T1}+1)$ is less than or equal to a longitudinal size kh of the de-convolution kernel, and $(P+K_2 \times sw - P_{L1}+1)$ is less than or equal to a transverse size kw of the de-convolution kernel.

Optionally, the matrix obtaining module 1103 includes:

a first filling sub-module configured to calculate the number of left-side target filling layers according to the number of left-side reverse filling layers and the column serial number of the sub-convolution kernel, and calculate the number of top target filling layers according to the number of top reverse filling layers and the row serial number of the sub-convolution kernel;

a matrix size sub-module configured to calculate a transverse size of the de-convolution sub-matrix according to a transverse size of the target feature matrix, the transverse sliding step length and the column serial number of the sub-convolution kernel, and calculate a longitudinal size of the de-convolution sub-matrix according to a longitudinal size of the target feature matrix, the longitudinal sliding step length and the row serial number of the sub-convolution kernel;

a right filling sub-module configured to determine the number of right-side target filling layers according to a transverse size of the image feature matrix, the transverse size of the de-convolution sub-matrix, a transverse size of the sub-convolution kernel and the number of left-side target filling layers;

a bottom filling sub-module configured to determining the number of bottom target filling layers according to a longitudinal size of the image feature matrix, the longitudinal size of the de-convolution sub-matrix, a longitudinal size of the sub-convolution kernel and the number of top target filling layers; and a matrix determining sub-module configured to determine the original sub-matrix corresponding to the sub-convolution kernel according to the target feature matrix, the number of left-side target filling layers, the number of right-side target filling layers, the number of top target filling layers and the number of bottom target filling layers.

Optionally, the first filling sub-module includes:
a left filling sub-module configured to obtain the number of left-side target filling layers by subtracting the column serial number of the sub-convolution kernel from the number of left-side reverse filling layers.

Optionally, the first filling sub-module includes:
a top filling sub-module configured to obtain the number of top target filling layers by subtracting the row serial number of the sub-convolution kernel from the number of top reverse filling layers.

Optionally, the matrix size sub-module includes:
a first calculation sub-module configured to calculate a quotient $d_1$ and a remainder $r_1$ of the transverse size of the target feature matrix and the transverse sliding step length;
a first transverse sub-module configured to determine $(d_1+1)$ as the transverse size of the de-convolution sub-matrix, if the column serial number of the sub-convolution kernel is less than $r_1$;
a second transverse sub-module configured to determine $d_1$ as the transverse size of the de-convolution sub-matrix, if the column serial number of the sub-convolution kernel is greater than or equal to $r_1$.

Optionally, the matrix size sub-module includes:
a second calculation sub-module configured to calculate a quotient $d_2$ and a remainder $r_2$ of the longitudinal size of the target feature matrix and the longitudinal sliding step length;
a first longitudinal sub-module configured to determine $(d_2+1)$ as the longitudinal size of the de-convolution sub-matrix, if the row serial number of the sub-convolution kernel is less than $r_2$;
a second longitudinal sub-module configured to determine $d_2$ as the longitudinal size of the de-convolution sub-matrix, if the row serial number of the sub-convolution kernel is greater than or equal to $r_2$.

The right filling sub-module is specifically configured to obtain the number of right-side target filling layers by subtracting the transverse size of the image feature matrix, the number of left-side target filling layers and one, from a sum of the transverse size of the de-convolution sub-matrix and the transverse size of the sub-convolution kernel.

The bottom filling sub-module is specifically configured to obtain the number of bottom target filling layers by subtracting the transverse size of the image feature matrix, the number of top target filling layers and one, from a sum of the longitudinal size of the de-convolution sub-matrix and the longitudinal size of the sub-convolution kernel.

It should be noted that information interaction and execution processes between the above devices/units are based on the same conception as the embodiments of the present disclosure, therefore, specific functions and technical effects brought by the above devices/units can be detailed in the embodiments of the present method, which will not be repeated here.

A Third Embodiment

Figure 12:
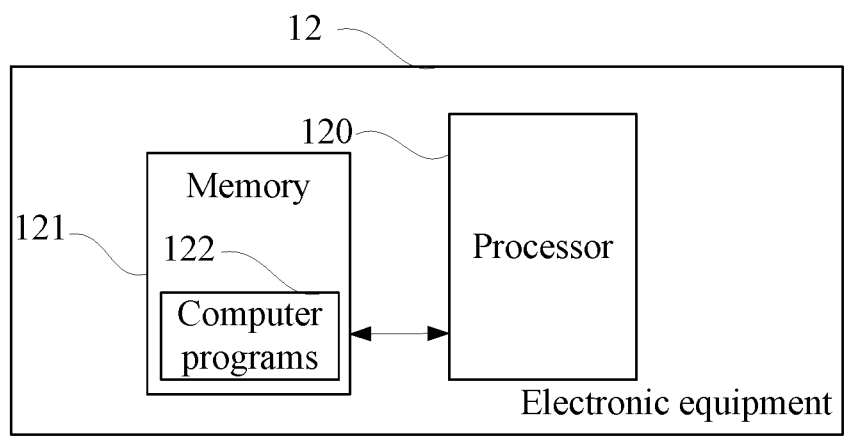
FIG. 12 is a schematic diagram of an electronic equipment in accordance with an embodiment of the present disclosure.

FIG. 12 is a schematic diagram of an electronic equipment in accordance with an embodiment of the present disclosure. Referring to FIG. 12, the electronic equipment includes: a processor 120, a memory 121 and computer programs 122 stored in the memory 121 and performed by the processor 120 to implement steps in the embodiment of the image processing method above mentioned, for example, the steps S101-S105 shown in FIG. 1. Alternatively, the processor 120 is configured to perform the computer programs 122 to implement functions of the modules/units of the embodiments described in the image processing device above mentioned, such as functions of modules 1101 to 1105 shown in FIG. 11.

Specifically, the computer program 122 can be segmented into one or more modules/units that are stored in the memory 121 and performed by the processor 120 to implement the present disclosure. The one or more modules/units can be a series of computer program instruction segments capable of performing specific functions, which are configured to describe execution of the computer programs 122 in the electronic equipment 12. For example, the computer programs 122 can be segmented to a data obtaining module, a kernel splitting module, a matrix obtaining module, a convolution operation module, and a matrix synthesis module, specific functions of each module are as follows:

a data obtaining module 1101 configured to obtain an image feature matrix and a de-convolution kernel;

a kernel splitting module 1102 configured to split the de-convolution kernel according to a preset splitting mode to obtain a sub-convolution kernel;

a matrix obtaining module 1103 configured to determine an original sub-matrix corresponding to the sub-convolution kernel, according to parameters of the sub-convolution kernel and the image feature matrix;

a convolution operation module 1104 configured to perform a convolution operation on the original sub-matrix corresponding to the sub-convolution kernel by using the sub-convolution kernel to obtain a de-convolution sub-matrix corresponding to the sub-convolution kernel and a matrix synthesis module 1105 configured to determine a target feature matrix according to the de-convolution sub-matrix corresponding to each sub-convolution kernel.

The electronic equipment 12 can be a computing device such as a desktop computer, a notebook, a handheld computer and a cloud server. The electronic equipment 12 can include, but is not limited to, the processor 120 and the memory 121. It can be understood for an ordinary skilled person in the art that: FIG. 12 is only an example of the electronic equipment 12, but is not limited thereto, the electronic equipment 12 can include more or less components than illustrated in FIG. 12, or some combination of components, or different components. For example, the electronic equipment 12 can also include input/output devices, network access devices, buses, etc.

The processor 120 can be a Central Processing Unit (CPU), other general-purpose processors, a Digital Signal Processor (DSP), an Application Specific Integrated Circuit (ASIC), a Field-Programmable Gate Array (FPGA) or other programmable logic devices, discrete gates or transistor logic devices, discrete hardware components, etc. The general-purpose processor can be a microprocessor or any conventional processors, etc.

The memory 121 can be an internal storage unit within the electronic equipment 12, such as a hard disk or a memory of the electronic equipment 12. The memory 121 can also be an external storage device of the electronic equipment 12, such as a plug-in hard disk, a Smart Media Card (SMC), a Secure Digital (SD) Card, and a Flash Card, etc. equipped on the electronic equipment 12. Furthermore, the memory 121 can also include both an internal storage unit of the electronic equipment 12 and an external storage device. The memory 121 is configured to store computer programs and other programs and data required by the electronic equipment 12, and temporarily store data that has been output or to be output.

An ordinary skilled person in the art can be clearly understood that: for convenient and simple description, the above functional units and modules are only split to illustrate with examples. In a practical application, different functional units and modules can be assigned to implement the above functions according to needs, that is, internal structures of the apparatus can be split into different functional units or modules to complete all or part of the functions described above. Each functional unit or each module in embodiments of the present disclosure can be integrated in a processing unit, or each unit can physically exist separately, or two or more units can be integrated in a unit. The above-mentioned integrated units can be realized in the form of hardware or software functional units. In addition, specific names of each functional unit and each module are only to conveniently distinguish with each other, but are not limited to the protection scope of the present disclosure. A specific working process of the units and modules in the above system can be referred to the corresponding process in the embodiment of the above method, which is not repeated here.

In the above embodiments, the description of each embodiment has its own emphasis, and parts without detailed description in one embodiment can be referred to relevant description of other embodiments.

An ordinary skilled person in the art can be aware that various illustrative units and algorithm steps described in connection with the embodiments disclosed herein can be implemented as electronic hardware or combinations of computer software and electronic hardware. Whether these functions are performed in hardware or software modes depends on a specific application of the technical solution and design constraints. Professionals can use different methods for each specific application to achieve the functions described, but such implementation should not be considered outside the scope of this application.

It should be understood that the disclosed apparatus/terminal equipment and method in the embodiments provided by the present disclosure can be implemented in other ways. For example, the embodiments of the apparatus/terminal equipment described above are merely schematic; for example, the splitting of the modules or units is merely a splitting of logical functions, which can also be realized in other ways; for example, multiple units or components can combined or integrated into another system, or some features can be ignored or not implemented. On the other hand, the coupling, direct coupling or communication connection shown or discussed can be achieved through some interfaces, indirect coupling or communication connection between devices or units can electrical, mechanical or otherwise.

The units described as separation parts can or can't be physically separated, and the parts displayed as modules can or can't be physical units, that is, they can be located in one place, or can be distributed on a plurality of network units. Some or all of the units can be selected according to actual needs to implement the purpose of the present disclosure.

In addition, each functional unit in each embodiment of the present disclosure can be integrated in a processing unit, or each unit can be separately formed with a physical form, or two or more units can be integrated in one unit. The above integrated units can be implemented either in a hardware form or in the form of hardware plus software function modules.

The integrated modules/units can be stored in a computer readable memory if implemented in the form of software program modules and sold or used as a separate product. Based on this understanding, all or part of the steps in the method of the above embodiment in the present disclosure can be implemented by computer program instructions of relevant hardware which can be stored in a computer readable storage medium, the computer program can be performed by the processor to implement the steps in the various methods of the above embodiments. Furthermore, the computer program includes computer program codes, which can be in a form of source codes, object codes, executable files or some intermediate forms, etc. The computer readable medium can include: any entities or devices capable of carrying the computer program codes, a recording medium, a U disk, a mobile hard disk drive, a diskette or a CD-ROM, a computer Memory, a Read-Only Memory (ROM), a Random Access Memory (RAM), an electrical carrier signal, a telecommunication signal and a software distribution medium, etc. It should be noted that content contained in the computer readable storage medium can be added or reduced as appropriate to the requirements of legislation and patent practice within the jurisdictions, for example, in some jurisdictions, in accordance with legislation and patent practice, computer readable storage medium do not include electrical carrier signals and telecommunications signals.

The above embodiments are used only to describe, but not limited to, the technical solution of the present disclosure. Although the features and elements of the present disclosure are described as embodiments in particular combinations, an ordinary skilled person in the art should understand that: each feature or element can be used alone or in other various combinations within the principles of the present disclosure to the full extent indicated by the broad general meaning of the terms in which the appended claims are expressed. Any variation or replacement made by one of ordinary skill in the art without departing from the spirit of the present disclosure shall fall within the protection scope of the present disclosure.

What is claimed is:

1. An image processing method, comprising:
   obtaining an image feature matrix and a deconvolution kernel;
   splitting the deconvolution kernel according to a preset splitting mode to obtain a sub-convolution kernel;
   determining an original sub-matrix corresponding to the sub-convolution kernel, according to parameters of the sub-convolution kernel and the image feature matrix;
   performing a convolution operation on the original sub-matrix corresponding to the sub-convolution kernel by using the sub-convolution kernel to obtain a deconvolution sub-matrix corresponding to the sub-convolution kernel; and
   determining a target feature matrix according to the deconvolution sub-matrix corresponding to each sub-convolution kernel; wherein
   the step of determining an original sub-matrix corresponding to the sub-convolution kernel, according to parameters of the sub-convolution kernel and the image feature matrix, comprises:
      calculating the number of left-side target filling layers, according to the number of left-side reverse filling layers and a column serial number of the sub-convolution kernel, and calculating the number of top target filling layers according to the number of top reverse filling layers and a row serial number of the sub-convolution kernel;
      calculating a transverse size of the deconvolution sub-matrix according to a transverse size of the target feature matrix, a transverse sliding step length of the deconvolution kernel and the column serial number of the sub-convolution kernel, and calculating a longitudinal size of the deconvolution sub-matrix according to a longitudinal size of the target feature matrix, a longitudinal sliding step length of the deconvolution kernel and the row serial number of the sub-convolution kernel;

determining the number of right-side target filling layers according to a transverse size of the image feature matrix, a transverse size of the deconvolution sub-matrix, a transverse size of the sub-convolution kernel and the number of left-side target filling layers;

determining the number of bottom target filling layers according to a longitudinal size of the image feature matrix, a longitudinal size of the deconvolution sub-matrix, a longitudinal size of the sub-convolution kernel and the number of top target filling layers; and determining the original sub-matrix corresponding to the sub-convolution kernel according to the target feature matrix, the number of left-side target filling layers, the number of the right-side target filling layers, the number of top target filling layers and the number of bottom target filling layers.

2. The image processing method as claimed in claim 1, wherein the step of splitting the deconvolution kernel according to a preset splitting mode to obtain a sub-convolution kernel, comprises:

obtaining the transverse sliding step length sw and the longitudinal sliding step length sh of the deconvolution kernel; and splitting the deconvolution kernel according to the transverse sliding step length and the longitudinal sliding step length to obtain (sw×sh) sub-convolution kernels.

3. The image processing method as claimed in claim 2, wherein the step of splitting the deconvolution kernel according to the transverse sliding step length and the longitudinal sliding step length to obtain (sw×sh) sub-convolution kernels, comprises:

obtaining the row serial number Q and the column serial number P of the sub-convolution kernel, wherein Q is a natural number smaller than sh, and P is a natural number smaller than sw;

determining a weight value of a $(Q+K_1 \times sh-P_{T1}+1)$-th row and a $(P+K_2 \times sw-P_{L1}+1)$-th column in the deconvolution kernel as a weight value of the sub-convolution kernel to obtain the (sw×sh) sub-convolution kernels;

wherein, K1 and K2 are natural numbers, $P_{L1}$ is the number of left-side reverse filling layers, $P_{T1}$ is the number of top reverse filling layers, $(Q+K_1 \times sh-P_{T1}+1)$ is less than or equal to the longitudinal size kh of the deconvolution kernel, and $(P+K_2 \times sw-P_{L1}+1)$ is less than or equal to the transverse size kw of the deconvolution kernel.

4. The image processing method as claimed in claim 2, wherein the step of calculating the number of left-side target filling layers according to the number of left-side reverse filling layers and the column serial number of the sub-convolution kernel, comprises:

obtaining the number of left-side target filling layers by subtracting the column serial number of the sub-convolution kernel from the number of left-side reverse filling layers.

5. The image processing method as claimed in claim 2, wherein the step of calculating the number of top target filling layers according to the number of top reverse filling layers and the row serial number of the sub-convolution kernel, comprises:

obtaining the number of top target filling layers by subtracting the row serial number of the sub-convolution kernel from the number of top reverse filling layers.

6. The image processing method as claimed in claim 2, wherein the step of calculating a transverse size of the deconvolution sub-matrix according to a transverse size of the target feature matrix, the transverse sliding step length of the deconvolution kernel and the column serial number of the sub-convolution kernel, comprises:

calculating a quotient $d_1$ and a remainder $r_1$ of the transverse size of the target feature matrix and the transverse sliding step length;

if the column serial number of the sub-convolution kernel is less than $r_1$, determining $(d_1+1)$ as the transverse size of the deconvolution sub-matrix; and if the column serial number of the sub-convolution kernel is greater than or equal to $r_1$, determining $d_1$ as the transverse size of the deconvolution sub-matrix.

7. The image processing method as claimed in claim 2, wherein the step of calculating a longitudinal size of the deconvolution sub-matrix according to a longitudinal size of the target feature matrix, the longitudinal sliding step length of the deconvolution kernel and the row serial number of the sub-convolution kernel, comprises:

calculating a quotient $d_2$ and a remainder $r_2$ of the longitudinal size of the target feature matrix and the longitudinal sliding step length of the deconvolution kernel;

if the row serial number of the sub-convolution kernel is less than $r_2$, determining $(d_2+1)$ as the longitudinal size of the deconvolution sub-matrix; and if the row serial number of the sub-convolution kernel is greater than or equal to $r_2$, determining $d_2$ as the longitudinal size of the deconvolution sub-matrix.

8. The image processing method as claimed in claim 2, wherein the step of determining the number of right-side target filling layers according to a transverse size of the image feature matrix, a transverse size of the deconvolution sub-matrix, a transverse size of the sub-convolution kernel and the number of left-side target filling layers, comprises:

obtaining the number of right-side target filling layers by subtracting the transverse size of the image feature matrix, the number of left-side target filling layers and one, from a sum of the transverse size of the deconvolution sub-matrix and the transverse size of the sub-convolution kernel.

9. The image processing method as claimed in claim 2, wherein the step of determining the number of bottom target filling layers according to a longitudinal size of the image feature matrix, a longitudinal size of the deconvolution sub-matrix, a longitudinal size of the sub-convolution kernel and the number of top target filling layers, comprises:

obtaining the number of bottom target filling layers by subtracting the transverse size of the image feature matrix, the number of top target filling layers and one, from a sum of the longitudinal size of the deconvolution sub-matrix and the longitudinal size of the sub-convolution kernel.

10. An image processing device, comprising:

a data obtaining module configured to obtain an image feature matrix and a deconvolution kernel;

a kernel splitting module configured to split the deconvolution kernel according to a preset splitting mode to obtain a sub-convolution kernel;

a matrix obtaining module configured to determine an original sub-matrix corresponding to the sub-convolution kernel, according to parameters of the sub-convolution kernel and the image feature matrix;

a convolution operation module configured to perform a convolution operation on the original sub-matrix corresponding to the sub-convolution kernel by using the sub-convolution kernel to obtain a deconvolution sub-matrix corresponding to the sub-convolution kernel; and a matrix synthesis module configured to determine a target feature matrix according to the deconvolution sub-matrix corresponding to each sub-convolution kernel; and wherein the matrix obtaining module comprises:

a first filling sub-module configured to calculate the number of left-side target filling layers according to the number of left-side reverse filling layers and a column serial number of the sub-convolution kernel, and calculate the number of top target filling layers according to the number of top reverse filling layers and a row serial number of the sub-convolution kernel;

a matrix size sub-module configured to calculate a transverse size of the deconvolution sub-matrix according to a transverse size of the target feature matrix, a transverse sliding step length of the deconvolution kernel and the column serial number of the sub-convolution kernel, and calculate a longitudinal size of the deconvolution sub-matrix according to a longitudinal size of the target feature matrix, a longitudinal sliding step length of the deconvolution kernel and the row serial number of the sub-convolution kernel;

a right filling sub-module configured to determine the number of right-side target filling layers according to a transverse size of the image feature matrix, a transverse size of the deconvolution sub-matrix, a transverse size of the sub-convolution kernel and the number of left-side target filling layers;

a bottom filling sub-module configured to determining the number of bottom target filling layers according to a longitudinal size of the image feature matrix, a longitudinal size of the deconvolution sub-matrix, a longitudinal size of the sub-convolution kernel and the number of top target filling layers; and a matrix determining sub-module configured to determine the original sub-matrix corresponding to the sub-convolution kernel according to the target feature matrix, the number of left-side target filling layers, the number of right-side target filling layers, the number of top target filling layers and the number of bottom target filling layers.

11. The image processing device as claimed in claim 10, wherein the kernel splitting module comprises:

a sliding step length sub-module configured to obtain the transverse sliding step length sw and the longitudinal sliding step length sh of the deconvolution kernel; and a step length splitting sub-module configured to split the deconvolution kernel according to the transverse sliding step length and the longitudinal sliding step length to obtain (sw×sh) sub-convolution kernels.

12. The image processing device as claimed in claim 11, wherein the step length splitting sub-module comprises:

a sequence number obtaining sub-module configured to obtain the row serial number Q and the column serial number P of the sub-convolution kernel, wherein Q is a natural number smaller than sh, and P is a natural number smaller than sw;

a weight splitting sub-module configured to determine a weight value of a $(Q+K_1 \times sh - P_{T1}+1)$-th row and a $(P+K_2 \times sw - P_{L1}+1)$-th column in the deconvolution kernel as a weight value of the sub-convolution kernel to obtain the (sw×sh) sub-convolution kernels;

wherein, K1 and K2 are natural numbers, $P_{L1}$ is the number of left-side reverse filling layers, $P_{T1}$ is the number of top reverse filling layers, $(Q+K_1 \times sh - P_{T1}+1)$ is less than or equal to the longitudinal size kh of the deconvolution kernel, and $(P+K_2 \times sw - P_{L1}+1)$ is less than or equal to the transverse size kw of the deconvolution kernel.

13. An electronic equipment comprising a memory, a processor and computer programs stored in the memory and performed by the processor to implement steps of an image processing method, the image processing method comprising:

obtaining an image feature matrix and a deconvolution kernel;

splitting the deconvolution kernel according to a preset splitting mode to obtain a sub-convolution kernel;

determining an original sub-matrix corresponding to the sub-convolution kernel, according to parameters of the sub-convolution kernel and the image feature matrix;

performing a convolution operation on the original sub-matrix corresponding to the sub-convolution kernel by using the sub-convolution kernel to obtain a deconvolution sub-matrix corresponding to the sub-convolution kernel; and determining a target feature matrix according to the deconvolution sub-matrix corresponding to each sub-convolution kernel; wherein the step of determining an original sub-matrix corresponding to the sub-convolution kernel, according to parameters of the sub-convolution kernel and the image feature matrix, comprises:

calculating the number of left-side target filling layers, according to the number of left-side reverse filling layers and a column serial number of the sub-convolution kernel, and calculating the number of top target filling layers according to the number of top reverse filling layers and a row serial number of the sub-convolution kernel;

calculating a transverse size of the deconvolution sub-matrix according to a transverse size of the target feature matrix, a transverse sliding step length of the deconvolution kernel and the column serial number of the sub-convolution kernel, and calculating a longitudinal size of the deconvolution sub-matrix according to a longitudinal size of the target feature matrix, a longitudinal sliding step length of the deconvolution kernel and the row serial number of the sub-convolution kernel;

determining the number of right-side target filling layers according to a transverse size of the image feature matrix, a transverse size of the deconvolution sub-matrix, a transverse size of the sub-convolution kernel and the number of left-side target filling layers;

determining the number of bottom target filling layers according to a longitudinal size of the image feature matrix, a longitudinal size of the deconvolution sub-matrix, a longitudinal size of the sub-convolution kernel and the number of top target filling layers; and determining the original sub-matrix corresponding to the sub-convolution kernel according to the target feature matrix, the number of left-side target filling layers, the number of the right-side target filling layers, the number of top target filling layers and the number of bottom target filling layers.

* * * * *